United States Patent [19]

Tekippe et al.

[11] 4,374,328

[45] Feb. 15, 1983

[54] PHOTOLUMINESCENT INDICATOR

[75] Inventors: Vincent J. Tekippe, Des Plaines; Lawrence E. Lach, Chicago, both of Ill.

[73] Assignee: Gould Inc., Rolling Meadows, Ill.

[21] Appl. No.: 257,825

[22] Filed: Apr. 27, 1981

[51] Int. Cl.³ .......................... F21V 9/16; G01J 5/00; G01J 5/48

[52] U.S. Cl. .................................. 250/458.1; 73/700; 250/461.1; 356/43; 356/44; 356/46; 374/121; 374/129; 374/131

[58] Field of Search ............... 250/458.1, 459.1, 461.1; 73/700, 705; 356/43, 44, 46; 374/121, 129, 131

[56] References Cited

U.S. PATENT DOCUMENTS

| | | |
|---|---|---|
| 2,551,650 | 5/1951 | Urbach . |
| 2,945,954 | 7/1960 | Gaugler ............................ 250/459.1 |
| 3,256,518 | 6/1966 | Crane . |
| 3,529,155 | 9/1970 | Hansen . |
| 3,639,765 | 2/1972 | Kleinerman . |
| 4,016,761 | 4/1977 | Rozzell et al. . |
| 4,075,493 | 2/1978 | Wickersheim . |
| 4,111,050 | 9/1978 | Waddoups . |
| 4,136,566 | 1/1979 | Christensen . |
| 4,140,393 | 2/1979 | Cetas . |
| 4,151,747 | 5/1979 | Gottlieb et al. . |
| 4,179,927 | 12/1979 | Saaski . |
| 4,180,739 | 12/1979 | Abu-Shumays . |
| 4,223,226 | 9/1980 | Quick et al. ...................... 250/458.1 |
| 4,245,507 | 1/1981 | Samulski .......................... 250/461.1 |

OTHER PUBLICATIONS

Grüneis, et al., "Phase Fluorimetry with Variable Duty Cycle 'Electrical' Phosphoroscope", *Journal of Physics E: Scientific Instruments*, 1976, vol. 9.
NASA Report No. NASA CR-159519; James, et al.; "Analysis and Preliminary Design of Optical Sensors for Propulsion Control," (1/23/79).

*Primary Examiner*—Davis L. Willis
*Attorney, Agent, or Firm*—Kay H. Pierce; Edward E. Sachs

[57] ABSTRACT

A photoluminescent indicator apparatus having automatic feedback means to maintain the sensitivity of the indicator apparatus with respect to variations in environmental conditions. The apparatus includes a sample of photoluminescent material having a photoluminescent decay rate which varies as a function of environmental conditions. The sample is positioned in a remote location having some unknown aspect of the environment desired to be measured. The sample is optically excited with a modulating signal to generate an excitation output signal functionally dependent on the modulating signal and indicative of the unknown environmental condition. A phase detection means is provided for comparing difference in phase between a phase reference signal and the excitation output signal to generate a phase differential signal functionally related to the photoluminescent decay rate of the sample. The indicator apparatus includes an automatic feedback means for adjusting the phase reference signal in accordance with the phase differential signal.

20 Claims, 3 Drawing Figures

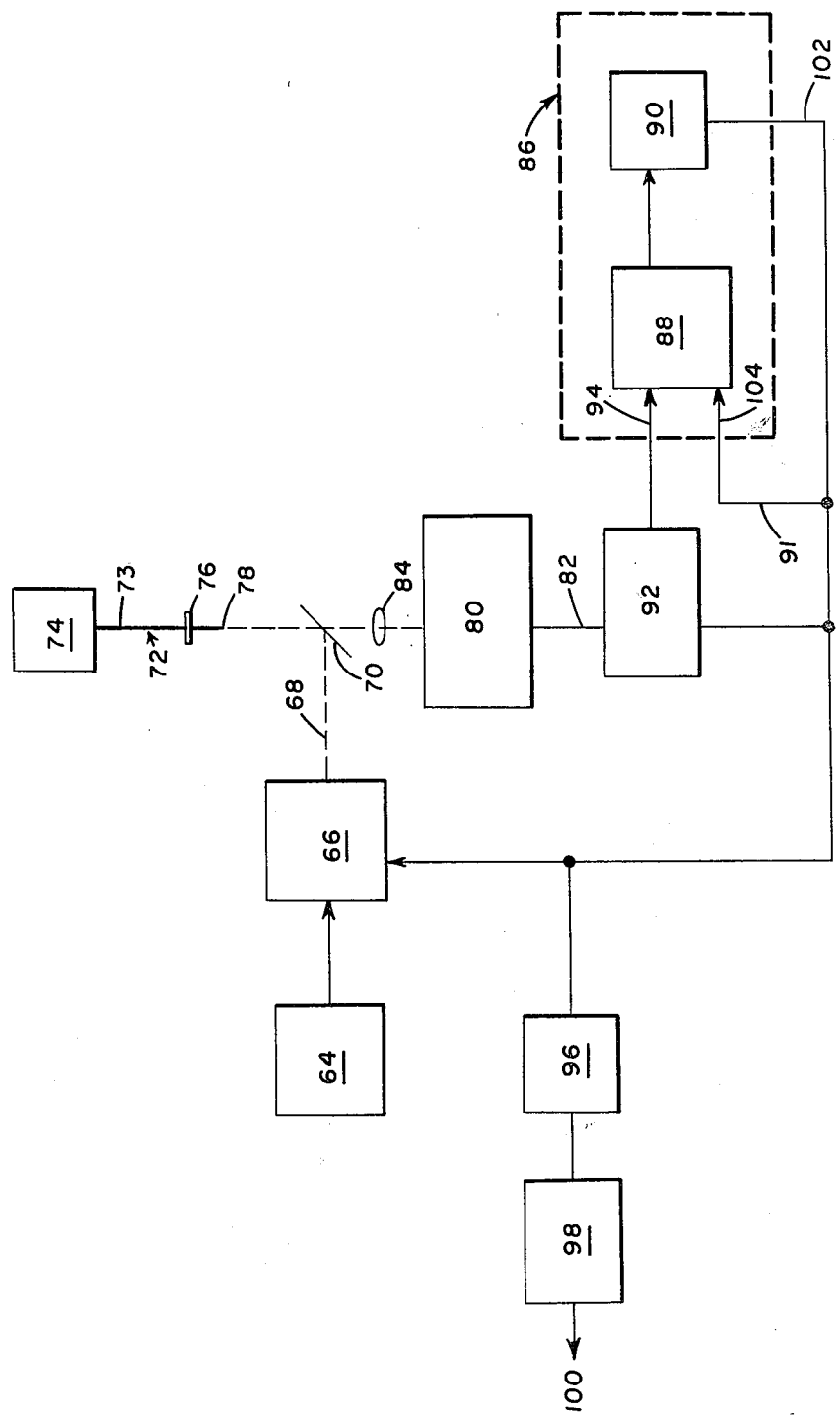

PHOTOLUMINESCENT INDICATOR

BACKGROUND OF THE INVENTION

1. Field of the Invention

This invention relates to photoluminescent indicators and in particular to indicators for indicating temperature and/or pressure conditions.

2. Description of the Prior Art

Photoluminescent thermometers are used in hostile environments, such as where magnetic fields and ultrasonic waves are present. One environment is found in the medical treatment of cancer by inducing local hypothermia. Other devices for use in such environments include liquid crystal, birefringent crystals, optical etalon sensors, fluid viscosity sensors and the like.

The determination of variable pressure conditions may also present problems in connection with requirements for such determinations in environments hostile to the conventional pressure sensing devices.

It is known that the decay curve of a photoluminescent material is both temperature and pressure sensitive. A number of devices have been developed for measuring the photoluminescent intensity decay so as to provide a corresponding indication of the temperature of the photoluminescent probe material.

One problem with using photoluminescent material to indicate either pressure or temperature conditions is that the decay curve of the photoluminescent material is not fully linear or exponential, but is a relatively complicated function that is difficult to predict. In the prior art structures, determination of the particular decay characteristics of a photoluminescent probe have been required to permit the use thereof for determination of temperature and pressure conditions.

Another problem inherent in such prior art structures is the problem of maintenance of accurate preselected levels of input light pulse intensity.

An extensive analysis of the use of optical sensors is set forth in Report No. NASA CR-159519. As discussed therein, Fabry-Perot temperature sensors may be utilized as remote fiber-optic transducers.

In "Phase Flurometry with Variable Duty Cycle 'Electrical' Phosphoroscope," *Journal of Physics E: Scientific Instruments,* Vol. 9, 1013–1017 (1976), F. Gruneis, et al. disclosed the use of fast electrical switching means between a photomultiplier and a lock-in amplifier to allow the recording of a slow decaying component that is produced by a photoluminescent probe. The authors discussed the determination of the phosphorescent decay time by using an optical chopper with a variable speed. The authors suggest the use of a MOSFET transistor as a fast gate in the control apparatus. They point out that it is possible to do phosphorescent lifetime measurements by a phase shift technique.

In U.S. Pat. No. 4,075,493 to Wickersheim, the use of photoluminescent material is disclosed in connection with that technique of measurement wherein the phosphor material emits at least two optically isolatable wavelength ranges whose intensity ratio depends upon the object or environment temperature.

U.S. Pat. No. 4,179,972 to Saaski, discloses a temperature-sensing device having a temperature-responsive substance with a characteristic of changing in optical density with changes in temperature. The optical density changes are detected and monitored to indicate the temperature of the object.

In U.S. Pat. No. 4,140,393 to Cetas, a birefringent crystal thermometer is disclosed utilizing a beam splitter to generate two light beams. One light beam is passed through an optical fiber bundle for providing light to the photoluminescent probe. The second light beam generates a reference signal. Light returning from the probe is reflected by the beam splitter into an optical fiber which leads to a photodetector.

The concept of using photoluminescent thermometer probes in hostile environments such as microwave fields, is discussed in *Science,* Vol. 208, 193, 194 (1980). As taught therein, the luminescent response of the probe is delivered to a photomultiplier tube light detector through a fiber-optic bundle. However, in practice with this system, the temperature dependence of a given luminescent material must be experimentally determined for each sample of material. Further, this system does not include a feedback mechanism for maintaining the sensitivity of the system at a constant level over a range of temperatures.

SUMMARY OF THE INVENTION

In accordance with the present invention, an improved photoluminescent indicator apparatus is provided having a phase-sensitive feedback means. More specifically, the subject photoluminescent indicator apparatus comprehends a multiple output means for generating signals which produces a modulating signal for optically exciting a sample of photoluminescent material to generate an excitation output functionally dependent on the modulating signal and indicative of environmental conditions. The means for generating signals also generates a phase reference signal for comparison with the excitation output signal to generate a phase differential output signal. The phase differential output signal has a value dependent upon the difference in phase between the excitation signal and the phase reference signal. This output phase differential signal is functionally related to the photoluminescent decay rate of the photoluminescent material. An automatic feedback means is provided for adjusting the means for generating signals output for the phase reference signal in accordance with the phase differential signal. The means for generating signals further produces an output signal functionally related to photoluminescent decay based on information from the feedback means.

An object of the present invention is the provision of an improved photoluminescent indicator apparatus which requires little or no precalibration of the decay characteristics of a particular photoluminescent sample.

Another object of the present invention is the provision of an apparatus which is relatively rugged for field use.

A still further object of the invention is the provision of a photoluminescent indicator apparatus which is simple to use and does not require constant monitoring.

Other objects, advantages, and novel features of the present invention will become apparent from the following detailed description of the invention when considered in conjunction with the accompanying drawings.

BRIEF DESCRIPTION OF THE DRAWINGS

FIG. 3 is a schematic diagram of another embodiment of the subject development.

DETAILED DESCRIPTION OF THE PREFERRED EMBODIMENTS

Figure 1:
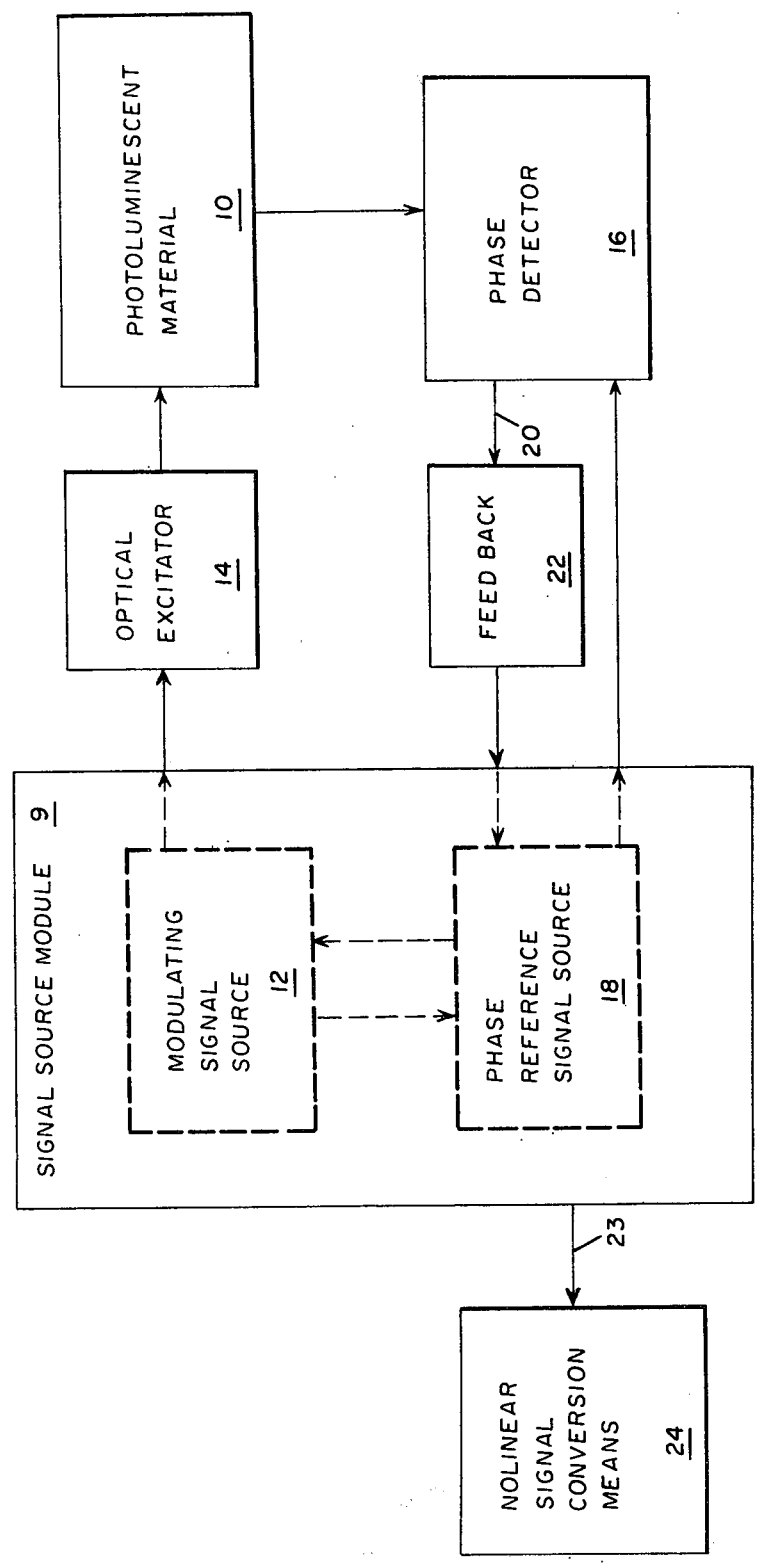
FIG. 1 is a block diagram of the photoluminescent indicator apparatus of the present invention.

Referring now to FIG. 1, a photoluminescent material 10 having a photoluminescent decay rate which varies as a function of environmental conditions is provided.

A multiple output means for generating signals illustrated in FIG. 1 as a signal source module 9 has a signal source 12 which creates a modulating signal having a repeatable wave form. The signal may take a variety of wave-form shapes, e.g., square or sinusoidal. Output from source 12 is conveyed to optical excitation means 14 for optically exciting photoluminescent material 10. Resulting photoluminescence is detected by phase detection means 16 and compared with an output from a phase reference signal source 18 included in multiple output means or signal source module 9 to generate a phase differential signal 20 functionally related to the photoluminescent decay rate of the photoluminescent material 10. A feedback means 22 is provided for producing an input signal to means for generating signals 9. The input signal may adjust the output of the phase reference signal source 18 in accordance with phase differential signal 20. A monitor 24 may be provided to convert an output of the means for generating signals 9 to a temperature or pressure reading. For instance, such an output may be frequency related to the temperature of sample 10.

Accordingly, the means for generating signals supplies a modulating signal to an optical excitation means 14 and a phase reference signal to a phase detector 16 in response to a feedback signal from a feedback means 22 so as to allow automatic phase sensitive measurement of a photoluminescent decay constant while, in addition, supplying an output signal to a nonlinear signal converter 24. The output signal of the converter 24 has a value which is functionally related to the value of the photoluminescent decay constant. Therefore, when a change in the temperature or pressure of the photoluminescent material 10 occurs, a change in the variable output 20 of phase detection means 16 occurs so as to correspondingly change the output of phase reference signal source 18 and to provide a changed input from the phase reference signal source to the phase detector 16 to maintain a generally constant phase difference between signals provided by phase reference signal source 18 and photoluminescent material 10. Resultingly, the sensitivity of phase detector 16 to variations in temperature or pressure remains constant and an output 23 from signal generating means 9 has a readily definable relationship to changes in temperature or pressure of photoluminescent material 10 in a manner described below.

Figure 2:
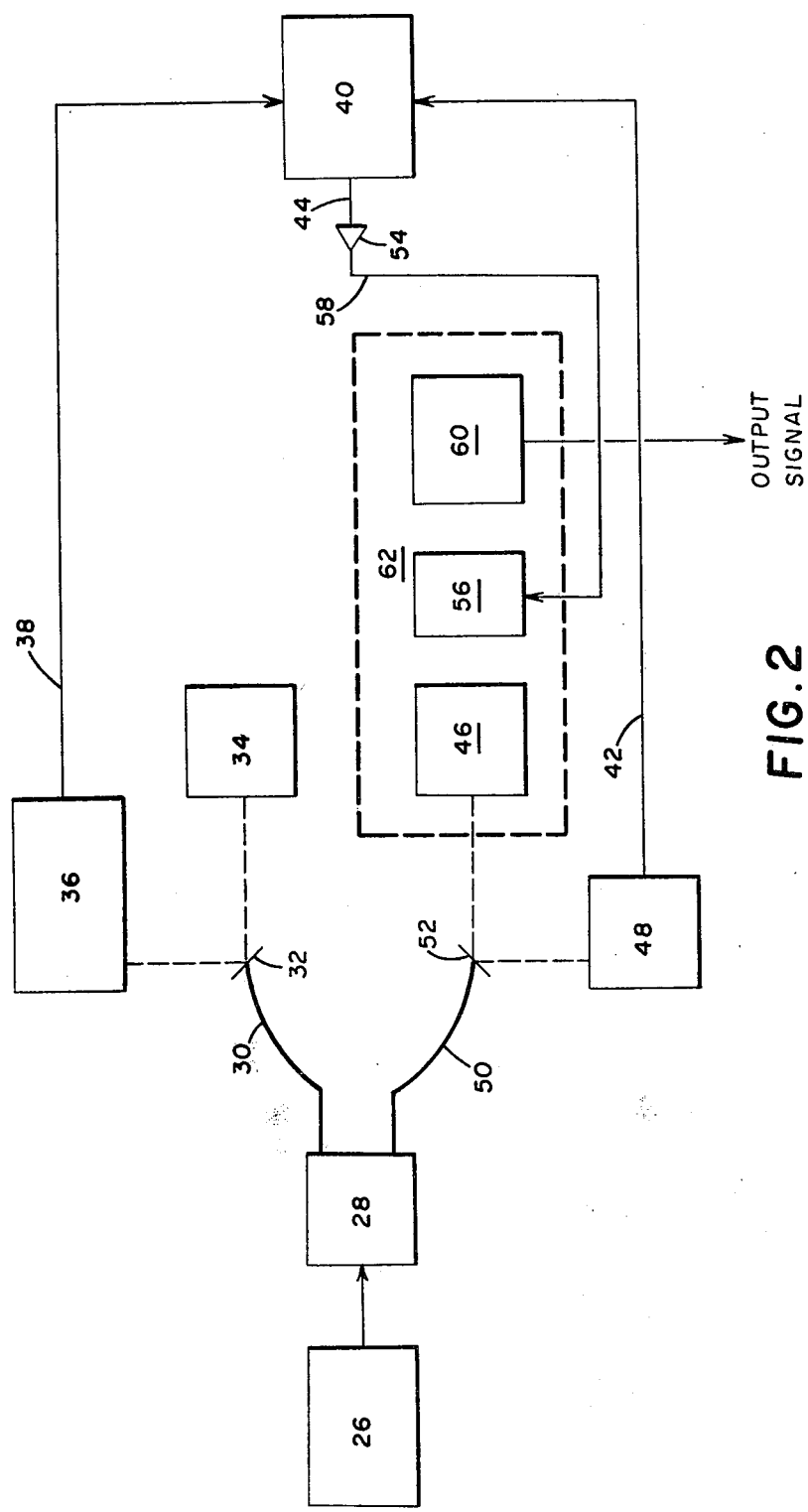
FIG. 2 is a schematic diagram of one embodiment of the subject development.

Referring now to FIG. 2 which is a more detailed illustration of one embodiment of the subject development, the means for generating signals includes a modulating signal source which may include an oscillator 26 and a light source 28 having an optical output that is modulated by the oscillator 26.

The optical excitation means in this embodiment may include a first optical fiber 30 and a beam splitter 32 for directing a portion of the modulated light output from light source 28 toward a first sample of photoluminescent material 34 to excite the material and generate a first excitation output signal. The optical excitation means may further include a first optical-to-electrical signal converter 36 for converting the first optical excitation signal into a first electrical excitation signal 38.

The means for generating signals further includes a phase reference signal source means. In this embodiment the phase reference signal source means may include a second sample of photoluminescent material 46 having environment-dependent photoluminescent characteristics identical to the first sample 34, a second optical-to-electrical signal converter 48, a second optical-fiber means 50, and a second beam splitter 52. Modulated light from the modulating signal source is directed by optic fiber means 50 through the second beam splitter 52 toward the second sample 46 to optically excite the second sample to generate a second optical excitation output. The second optical excitation output is then reflected off of second beam splitter 52 and directed toward second optical-to-electrical signal converter 48. Optical-to-electrical signal converter 48 then converts the transmitted optical excitation output into a second electrical excitation signal, reference signal 42.

Phase detection means for this embodiment may include a comparator means 40 for receiving the first electrical excitation signal 38 and a first reference signal 42. The comparator means generates an output signal 44 functionally related to the difference in phase between the first electrical excitation signal 38 and the reference signal 42.

The automatic feedback means in this embodiment may include an amplifier 54 for receiving and filtering the phase differential signal 44, and an environment adjusting means 56 for receiving a filtered signal 58 from amplifier 54. Environment adjusting means may be a temperature or pressure controller, for example. If the adjustment means were a temperature controller, then the temperature adjustment means would be generally disposed in close proximity with the second photoluminescent sample 46 to modify the temperature of sample 46 in accordance with the phase differential signal 44 to maintain the first and second samples of photoluminescent material 36 and 48 respectively at substantially equal temperatures.

The means for generating signals may include conventional sensor 60 in this embodiment in close proximity with the second sample 46. For example, if the critical environmental condition to be monitored were temperature, then sensor 60 may be a conventional thermometer. Thus, through measurement of the temperature of second sample 46 the temperature of first sample 34 may be determined.

Accordingly, in the embodiment illustrated in FIG. 2, the first phosphorous sample 34 may be placed in a hostile environment having an unknown temperature which is desired to be measured. The second sample 46 may be isothermally mounted in an instrument box 62. Each sample is optically excited by identical modulated light beams from light source 28. The optical output from each sample is converted to electrical signals 38 and 42 which are compared for differences in phase between the two signals. Comparator means 40 generates an output signal functionally related to the difference in phase between the two signals. This output signal 44 is ultimately used to control environment adjusting means 56 to maintain both first and second photoluminescent samples at substantially equal temperatures. By isothermally mounting a sensor 60 in close proximity with the second photoluminescent sample 46 and the environment adjusting means 56, it is possible to readily determine the temperature of the first photoluminescent sample 34. Environment adjusting means may, alternatively, adjust the pressure, or some other critical environmental condition in the instrument box to maintain the second sample 46 in a substantially similar environment as the first sample.

In the embodiment illustrated in FIG. 3, the means for generating signals having a modulating signal source includes a light source 64 having an output that is modulated by an optical modulator 66. The modulator may be an oscillator or optical chopper to create a modulated optical signal 68.

In the embodiment illustrated in FIG. 3, the optical excitation means includes a beam splitter 70 and a fiber optic means 72. The modulated optical signal 68 from optical modulator 66 is transmitted to a partially silvered mirror which acts as beam splitter 70 to redirect light to an optical fiber 73. Optical fiber 73 directs modulated light from the modulating signal source toward a photoluminescent material sample 74 to excite the sample and generate a first excitation output signal. The fiber optic means 72 may include a connector 76 and a portion 78 between the connector 76 and the beam splitter 70.

The optical excitation means of this embodiment may further include an optical-to-electrical signal converter 80. The first excitation output signal from photoluminescent material 74 may be transmitted through fiber optic means 72 to optical-to-electrical signal converter 80. Optical-to-electrical signal converter 80 converts the optical excitation signal to an electrical excitation signal 82. If desired, a filter 84 may be provided between beam splitter 70 and converter 80 for preventing transmissions of light other than phosphorescent light from photoluminescent sample 74 to converter 80.

In the embodiment illustrated in FIG. 3, the phase-detection means may include a phase comparator 88 and a voltage controlled oscillator 90 in series. Accordingly, the phase reference signal source means in this embodiment may include a connector means 91 to feed output from voltage controlled oscillator 90 back into phase comparator 88. This type of arrangement is commonly known to those skilled in the art as a phaselock loop 86. If desired, a signal conditioning module 92 may be provided between converter 80 and phase comparator 88 for amplifying, filtering, and converting the signal from converter 80 into a square wave signal. The purpose of module 92 is to shape electrical excitation signal 92 into a form which is usable by the particular phase comparator apparatus employed.

Phaselock loop circuits are well known to those skilled in the art. They have been used in the past for synchronization of horizontal and vertical scan in television receivers; tracking moving vehicles; demodulating, multiplying, or dividing frequency; and for bit synchronization. Phaselock loops are described in depth in F. M. Gardner, *Phaselock Techniques,* John Wiley & Sons, Inc. (2nd ed.) (1979).

The operation of the indicator apparatus illustrated in FIG. 3 is extremely simple. Light from source 64 is modulated by modulator 66 so as to provide modulated light to beam splitter 70. The beam splitter reflects a portion of the light through the fiber-optic means 72 to the photoluminescent material sample 74, which may be disposed in a hostile environment. As discussed above, the decay time of the photoluminescence of the sample 74 varies as a function of the temperature and the pressure to which it is subjected. The decaying photoluminescent light is transmitted back through fiber-optic means 72 and beam splitter 70 to converter 80.

As indicated above, the converter provides an output electrical signal which corresponds to the optical decay signal from sample 74. The electrical signal from converter 80 is delivered through a signal conditioning module 92 to phase comparator 88 at one input 94 thereof.

As indicated above, the output from phaselock loop circuit 86 may be a signal having a frequency which is a function of an environmental condition of the sample 74 to be measured. For instance, if in the embodiment illustrated in FIG. 3, the condition to be measured were the temperature sensed by sample 74, the frequency of the output of phaselock loop 86 would be a function of the sample temperature. Pressure conditions could be monitored in an identical manner.

In the embodiment illustrated in FIG. 3, the multiple output means may include a frequency counter 96 and a nonlinear frequency-to-voltage converter 98 to provide a temperature indication signal 100.

The invention as illustrated in FIG. 3, comprehends using the variable frequency output signal 102 from phaselock loop 86 to control the modulation frequency of optical signal 68 by controlling the operation of optical modulator 66. Accordingly, the output signal from the phaselock loop 86 is also delivered back to optical modulator 66 and to a second input 104 of the phase comparator 88. Resultingly, the phaselock loop 86 operates to maintain a substantially constant difference between the signals 94 and 104 to phase comparator 88. Further, the rate of pulsing light to the photoluminescent sample 74 is caused to correspond directly to the rate of decay of the photoluminescent light from the sample so as to cause the sensitivity of the apparatus to remain constant, as a result of maintaining the fixed angle difference. This fixed angle difference may be set at 45°.

The invention as illustrated in FIG. 3 comprehends the consideration of the decay curve of the photoluminescent light from sample 74 as a signal for comparison with the variable frequency output signal of the phaselock loop 86. Resultingly, the adjustment of the modulation frequency corresponds directly to the temperature or pressure condition to be monitored so as to provide the desired improved functioning of the indicator apparatus. The feedback to the phaselock loop circuit effectively stabilizes the temperature or pressure indication notwithstanding variations in the amplitude intensity of the photoluminescent signal.

The indicator apparatus as illustrated in FIG. 2 is considered to be most appropriate for situations in which cost is a major factor and accuracy in measurement of temperature is not critical. The apparatus as illustrated in FIG. 3, on the other hand, is considered to be most appropriate when accuracy of measurement is more important than cost of the device. One possible application for the embodiment as illustrated in FIG. 3 is in the medical field to measure locally induced hypothermia in a patient. Both embodiments require relatively little or no precalibration and are relatively simple to operate because of the automatic feedback feature comprehended in the present invention.

While there has been described what is at present considered to be the preferred embodiment of the present invention, it will be obvious to those skilled in the art that various changes and modifications may be made therein, without departing from the invention, and it is, therefore, aimed in the appending claims to cover all such changes and modifications as fall within the true spirit and scope of the invention.

We claim:

1. A photoluminescent indicator apparatus comprising:
   a. a photoluminescent material having a photoluminescent decay rate which varies as a function of environmental conditions;
   b. a signal generating means having a phase reference signal means for generating a reference signal, and a signal source means for generating a modulating signal;
   c. means for optically exciting a first sample of said photoluminescent material in accordance with a first modulated signal from said modulating signal source to generate an excitation output signal functionally dependent on said first modulating signal and indicative of said environmental conditions;
   d. phase-detection means for comparing the difference in phase of said reference signal and said excitation output and for generating a phase differential signal functionally related to the photoluminescent decay rate of said first sample; and
   e. feedback means for adjusting said reference signal in accordance with said phase differential signal.

2. A photoluminescent indicator apparatus as recited in claim 1 wherein said feedback means modulates said reference signal source to maintain a substantially fixed phase angle difference between said reference signal and said first excitation output signal.

3. A photoluminescent indicator apparatus as recited in claim 1 wherein said modulating signal source includes an oscillator.

4. A photoluminescent indicator apparatus as recited in claim 3 wherein said modulating signal source further includes a light source having an output modulated by said oscillator.

5. A photoluminescent indicator apparatus as recited in claim 4 wherein said optical excitation means includes: first optical fiber and beam splitter means for directing modulating light from said modulating signal source toward a first sample of said photoluminescent material to excite said material and generate a first optical excitation output signal; and a first optical-to-electrical signal converter for converting said optical excitation signal to a first electrical excitation signal.

6. A photoluminescent indicator apparatus as recited in claim 5 wherein said phase-detection means further comprises: comparator means for receiving said first electrical excitation signal and said reference signal to generate said phase differential signal.

7. A photoluminescent indicator apparatus as recited in claim 6 wherein said phase reference signal means comprises: a second sample of photoluminescent material having environment-dependent photoluminescent characteristics identical to said first sample; a second optical-to-electrical signal converter; and second optical fiber and beam splitter means for directing modulated light from said signal source toward said second sample to optically excite said second sample to generate a second optical excitation output, said second excitation output being reflected off of said second beam splitter means to said second optical-to-electrical signal converter, said second optical-to-electrical signal converter converting said transmitted optical excitation output to a second electrical excitation signal for use as said reference signal.

8. A photoluminescent indicator apparatus as recited in claim 7 wherein said automatic feedback means comprises: an amplifier for receiving and filtering said phase differential signal; and environment adjusting means disposed in close proximity with said second photoluminescent sample for receiving a filtered signal from said amplifier, said adjustment means modifying the temperature of said second sample in accordance with said phase differential signal to maintain said first and second samples at substantially equal temperatures.

9. A photoluminescent indicator apparatus as recited in claim 1 wherein said means for generating signals includes means for measuring temperature having as an input signal said phase differential signal.

10. A photoluminescent indicator apparatus as recited in claim 9 wherein said temperature-measuring means includes a frequency counter.

11. A photoluminescent indicator apparatus as recited in claim 1 wherein said means for generating signals includes means for measuring pressure having as an input signal said phase differential signal.

12. A photoluminescent indicator apparatus as recited in claim 11 wherein said pressure-measuring means includes a frequency counter.

13. A photoluminescent indicator apparatus as recited in claim 1 wherein said modulating signal source includes a light source and an optical modulator to generate said first modulated signal having optical characteristics.

14. A photoluminescent indicator apparatus as recited in claim 13, wherein said optical modulator comprises an oscillator.

15. A photoluminescent indicator apparatus as recited in claim 13, wherein said modulating signal source includes a light source and an optical chopper.

16. A photoluminescent indicator apparatus as recited in claim 13, wherein said optical excitation means comprises a beam splitter and a fiber optic means for directing said first modulated signal to said photoluminescent material to optically excite said material to generate said first excitation output signal.

17. A photoluminescent indicator apparatus as recited in claim 1 wherein said phase-detection means includes a phase comparator and voltage control oscillator in series to generate said phase differential signal.

18. A photoluminescent indicator apparatus as recited in claim 1 wherein said phase reference signal means includes a connector means for receiving said phase differential signal from said phase-detection means to generate said reference signal.

19. A photoluminescent indicator apparatus as recited in claim 16 wherein said optical excitation means includes an optical-to-electrical signal converter for converting said first optical excitation signal to an electrical excitation signal; and said phase-detection means includes a phase comparator, to receive said reference signal and said electrical excitation signal; and a voltage control oscillator in series with said phase comparator to generate an output signal having a frequency functionally related to difference in phase between said reference signal and said electrical excitation signal for use as said phase differential signal.

20. A photoluminescent indicator apparatus as recited in claim 19 wherein said phase reference signal means includes a connector means for receiving output from said voltage control oscillator to generate said reference signal.

* * * * *